United States Patent [19]

Wright et al.

[11] Patent Number: 4,492,021

[45] Date of Patent: Jan. 8, 1985

[54] METHOD OF MAKING CATHODE CURRENT COLLECTORS FOR SODIUM SULPHUR CELLS

[75] Inventors: Michael L. Wright, Allestree; Alec R. Tilley, Blackbrook, near Belper, both of England

[73] Assignee: Chloride Silent Power Limited, London, England

[21] Appl. No.: 408,573

[22] Filed: Aug. 16, 1982

Related U.S. Application Data

[63] Continuation of Ser. No. 217,334, Dec. 17, 1980, abandoned.

[30] Foreign Application Priority Data

Dec. 24, 1979 [GB] United Kingdom ............... 7944348

[51] Int. Cl.³ .......................................... H01M 6/00
[52] U.S. Cl. .................................. 29/623.1; 29/421 R; 29/459; 29/623.5; 228/243; 228/263.13; 228/263.17; 228/903; 264/105; 264/259; 264/325; 264/332; 427/122; 427/423; 429/104
[58] Field of Search ............... 264/81, 105, 259, 325, 264/332, DIG. 57; 29/623.5, 421 R, 459; 429/104; 228/263.13, 263.17, 243, 131, 903, 263; 493/170; 427/423, 122

[56] References Cited

U.S. PATENT DOCUMENTS

| | | | |
|---|---|---|---|
| 2,478,037 | 8/1949 | Brennen | 228/243 X |
| 2,878,140 | 3/1959 | Barr | 29/421 |
| 3,320,356 | 5/1967 | Kirwin | 29/459 X |
| 3,671,317 | 6/1972 | Rifkin | 427/122 X |
| 3,811,943 | 5/1974 | Minck et al. | 429/104 |
| 3,982,957 | 9/1976 | Jones et al. | 429/163 |
| 4,024,320 | 5/1977 | Gibson et al. | 429/104 |
| 4,048,391 | 9/1977 | Tilley et al. | 429/104 |
| 4,048,394 | 9/1977 | Ludwig | 429/104 |
| 4,061,840 | 12/1977 | Jones et al. | 429/104 |
| 4,066,826 | 1/1978 | Jones et al. | 429/104 |
| 4,084,040 | 4/1978 | King | 429/104 |
| 4,094,184 | 9/1978 | Rozengart et al. | 228/131 |
| 4,094,897 | 6/1978 | Nagasawa et al. | 264/325 |
| 4,110,516 | 8/1978 | Breiter | 429/104 |
| 4,117,209 | 9/1978 | Markin et al. | 429/104 |
| 4,123,596 | 10/1978 | Robinson | 429/104 |
| 4,145,481 | 3/1979 | Gupta et al. | 427/423 X |
| 4,161,063 | 7/1979 | Goebel et al. | 29/623.5 |
| 4,166,156 | 8/1979 | Ludwig | 429/104 |
| 4,166,870 | 9/1979 | Henson | 427/122 |
| 4,169,120 | 9/1979 | Miller | 264/105 |
| 4,216,275 | 8/1980 | Hartman et al. | 429/104 |
| 4,232,098 | 11/1980 | Park et al. | 429/104 |
| 4,239,837 | 12/1980 | Hartmann et al. | 429/104 |
| 4,290,192 | 9/1981 | Elkins | 29/623.5 |
| 4,294,005 | 10/1981 | Brennan | 29/623.5 |

FOREIGN PATENT DOCUMENTS

| | | | |
|---|---|---|---|
| 2263381 | 7/1974 | Fed. Rep. of Germany | 29/421 R |
| 2506287 | 9/1975 | Fed. Rep. of Germany | 429/104 |
| 2905168 | 7/1980 | Fed. Rep. of Germany | 427/122 |
| 1496407 | 12/1977 | United Kingdom | 429/104 |
| 1595764 | 8/1981 | United Kingdom | 429/104 |

OTHER PUBLICATIONS

Bauer, R., et al, "Development of Sodium/Sulfur Cells," Paper presented at 11th Intersociety Energy Conversion Engineering Conference; State Line, Nevada, U.S.A. (Sep. 12-17, 1976).

Primary Examiner—Charlie T. Moon
Assistant Examiner—Ronald S. Wallace
Attorney, Agent, or Firm—Beveridge, DeGrandi & Kline

[57] ABSTRACT

In a sodium sulphur cell, improved protection of a cathode current collector is obtained by isostatically pressing graphite foil or flakes onto the surface of the collector, which surface is preferably roughened or coated with an intermediate conductive layer such as a nickel-chromium alloy or a conductive carbide providing a rough surface.

24 Claims, 3 Drawing Figures

METHOD OF MAKING CATHODE CURRENT COLLECTORS FOR SODIUM SULPHUR CELLS

This application is a continuation, of application Ser. No. 217,334, filed 12/17/80, now abandoned.

BACKGROUND OF THE INVENTION

1. Field of the Invention

This invention relates to sodium sulphur cells and to cathode current collectors for such cells and methods of making such cells and current collectors.

2. Prior Art

In a sodium sulphur cell, a solid electrolyte material, typically beta alumina, separates molten sodium, constituting the anode, from the cathodic reactant comprising molten sulphur and sodium polysulphides. The cathodic reactant is highly corrosive. The cathode current collectors must make electrical contact with the cathodic reactant and many proposals have been made regarding the construction of such current collectors. Although carbon and graphite are widely used because of their corrosion-resistant properties, they do have a very substantially higher electrical resistance than most metals. For this reason, use is made of composite current collectors having a substrate of a relatively highly conductive material with an outer sheath or coating of some material having good corrosion-resistant properties. Such an arrangement enables an aluminium substrate to be employed giving the advantages of the high conductivity of that material; aluminium however if exposed to the cathodic reactant in a sodium sulphur cell will form a sulphide coating which is non-conductive. It is important therefore that the outer coating should protect the aluminium from any exposure to the cathodic reactant. Reference is made to U.S. Pat. Nos. 3,982,975; 4,024,320; 4,061,840 and 4,219,690 as examples of composite cathode current collectors for sodium sulphur cells.

BRIEF SUMMARY OF THE INVENTION

According to one aspect of the present invention, a cathode current collector for a sodium sulphur cell is formed of conductive metal having a surface onto which or onto at least part of which a layer of graphite foil or graphite flakes has been isostatically pressed to force the foil or flakes to adhere to the surface.

The isostatic pressing of the graphite foil or flakes may be effected using a pressure in the range of 5,000 to 60,000 p.s.i. Typically a pressure of 40,000 p.s.i. might be employed. Preferably the graphite foil or flakes are pressed onto a rough surface. It has been found that, by such isostatic pressing onto a rough surface, it is possible to obtain a firmly adherent graphite layer which will withstand the conditions in the cathodic region of a sodium sulphur cell. The isostatic pressing not only gives firm adherence to the substrate but provides a further important advantage in that it densifies the graphite material. This material is homogenised and, for example, if graphite foil is wrapped around a cylindrical surface, with an overlap of the foil, then the isostatic pressing causes the overlapping portions to be homogenised.

It has been found that the surface of the conductive metal should have a roughness above one micron and preferably above five microns (these being centre line averages on the recognised engineering scale).

The invention furthermore includes within its scope a method of making a cathode current collector for a sodium sulphur cell comprising forming a collector of conductive metal, covering at least part of the surface of the collector with graphite foil or graphite flakes and subjecting the assembly to isostatic pressing to force the graphite foil to adhere to said surface. As stated above preferably the surface, to which the graphite foil or flakes is applied, is a rough surface.

Preferably the conductive metal is aluminium but other metals may be employed, for example, a nickel based alloy containing chromium and iron. Mild steel may be employed with a protective coating of a conductive material chemically inert to the cathodic reactant of a sodium sulphur cell.

The metal surface may be roughened where the graphite foil is to be applied. Such roughening may be effected by applying a surface coating of a conductive material to the metal. This intermediate surface coating is preferably a material resistant to corrosion in the cell environment. This coating may be a conductive carbide such as for example chromium carbide. Very conveniently however an aluminium or aluminium alloy substrate may be coated with a nickel-chromium alloy by flame spraying over the regions where the graphite foil or flakes are to be applied.

The invention includes within its scope a cathode current collector for a sodium sulphur cell made by the above-described method.

The invention furthermore includes within its scope a sodium sulphur cell having a cathode current collector as described above.

In one form of the invention, a sodium sulphur cell has a tubular electrolyte element separating sodium around the outer surface of the electrolyte element from cathodic reactant inside the tubular electrolyte element and there is provided a cathode current collector comprising a conductive metal rod or tube arranged axially within the electrolyte element, this metal rod or tube having a surface covered with graphite foil or graphite flakes isostatically pressed onto the surface of the rod or tube.

It will be appreciated that the graphite foil or flakes need only be applied over those parts of the surface of the current collector which would be exposed to the cathodic reactant when the cell is in use.

DESCRIPTION OF THE PREFERRED EMBODIMENT

Figure 1:
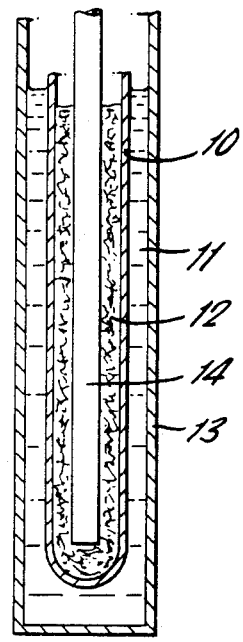
FIG. 1 illustrates diagrammatically a sodium sulphur cell of the central sulphur type.

In a sodium sulphur cell of the central sulphur type, as shown in FIG. 1, a tubular member 10 of solid electrolyte material, typically beta-alumina, separates liquid sodium 11 around the outside of the electrolyte tube from a cathodic reactant 12 comprising liquid sulphur/sodium polysulphides within the electrolyte tube. The sodium 11 lies in an annular region between the tube 10 and an outer housing 13 while the cathodic reactant 22 lies in an annular region between the inner surface of the tube 10 and an axially disposed current collector rod 14.

Figure 3:
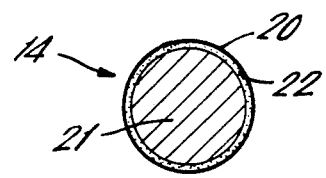
FIG. 3 is a transverse section, to a larger scale, of a cathode collector rod used in the cell of FIG. 1.

A rod-shaped cathode current collector for use as the current collector rod 14 of a sodium sulphur cell was made by wrapping a thin sheet 20 (FIG. 3) of graphite foil (about 0.2 to 0.25 mm thick) around a rod 21 of aluminium alloy having a surface coating 22 of flame-sprayed nickel-chromium alloy. A sheath of soft polymeric material such as rubber or plasticized polyvinylchloride was then placed over the graphite foil and the assembly was isostatically pressed by sealing the sheathed assembly in an outer pressure container, conveniently using rubber O-rings as seals in a cylindrical assembly, and applying a pressure of 40,000 p.s.i. hydraulically to the outer surface of the polymeric sheath. This pressure caused the graphite foil to adhere to the rough surface of the coated aluminium rod and it has been found that good adhesion can be obtained by this technique.

A rod made as described above was used as a cathode current collector in a sodium sulphur cell of the kind, such as has been described above, having a tubular solid electrolyte element with sodium around the outer surface of the electrolyte element and the cathodic reactant inside the electrolyte element and the annular region between the electrolyte surface and the current collector rod. The cell, with the cathode current collector formed as described above, was subjected to 100 charge and discharge cycles over a period of 100 days at the operating temperature of about 350° C. At the end of this period no visible damage to the surface of the current collector rod could be seen after the cell had been dismantled. No rise in electrical resistance of the cell was observed over this period. In another test, a group of five cells with cathode current collectors of aluminium having a flame-sprayed coating of nickel-chromium alloy and with a 0.25 mm thick layer of isostatically pressed graphite foil were on test for 345 days and completed 680 charge and discharge cycles at an operating temperature of 350° C. with no change in resistance.

Instead of using graphite foil, graphite flakes may be isostatically pressed onto the rough surface of the substrate. The flakes are made to form a thin layer completely covering at least that part of the surface which is exposed to the cathodic reactant in the cell.

If the cathodic reactant should, for any reason, penetrate the layer of graphite foil or flakes, the nickel-chromium layer forms a protection for the aluminium against chemical attack by the cathodic reactant.

Aluminium or aluminium alloy is the preferred substrate material because of its high electrical conductivity. Instead of using aluminium, it would be possible to use other metals, e.g. a nickel-based alloy containing chromium and iron. Mild steel may be used provided it has a protective conductive coating, e.g. by chromising.

Figure 2:
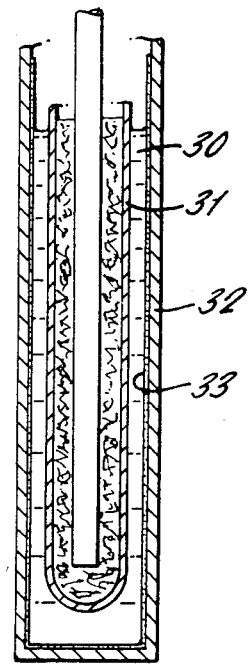
FIG. 2 illustrates diagrammatically a sodium sulphur cell of the central sodium type.

The invention is applicable to sodium sulphur cells of the central sodium type as well as to cells of the central sulphur type. In a sodium sulphur cell of the central sodium type, as shown in FIG. 2, the cathodic reactant 30 lies between the outer surface of an electrolyte tube 31 and the inner surface of the housing 32. The sodium lies inside the electrolyte tube. A similar isostatic pressing technique may be used to press graphite foil 33 or graphite flakes onto the internal surface of the housing 32 which surface is roughened, e.g. by applying a surface coating of a chromium carbide material or nickel-chromium alloy.

We claim:

1. In a method of making a cathode current collector for a sodium sulphur cell comprising forming a collector of a conductive metal and coating the metal with a corrosion resistant material, wherein the improvement consists of covering at least that part of the surface of the collector exposed to a corrosive material, with a material consisting of graphite foil and subjecting the assembly to isostatic pressing to force the graphite foil to adhere to said surface.

2. A method as claimed in claim 1 wherein the conductive metal is aluminium or an aluminium alloy.

3. A method as claimed in claim 1 wherein the conductive metal is a nickel-based alloy containing chromium and iron.

4. A method as claimed in claim 1 wherein the conductive metal is mild steel with a protective coating of an electrically conductive material chemically inert to the cathodic reactant of the sodium sulphur cell on which coating is applied the graphite foil.

5. A method as claimed in claim 2 wherein a surface coating of a conductive material is applied to the aluminum or aluminum alloy to form a rough surface on the aluminum or aluminum alloy, the graphite foil being applied over said coating.

6. A method as claimed in claim 5 wherein the surface coating is of a nickel-chromium alloy.

7. A method as claimed in claim 1 wherein said conductive metal has a rough surface onto which the graphite foil are applied.

8. A method as claimed in claim 7 wherein the rough surface is constituted by an intermediate layer of conductive material onto which the graphite foil are applied.

9. A method as claimed in claim 8 wherein said intermediate layer is a layer of material resistant to corrosion in the cell environment.

10. A method as claimed in claim 8 wherein the intermediate layer is a nickel-chromium alloy.

11. A method as claimed in claim 8 wherein said intermediate material is a conductive carbide.

12. A method as claimed in claim 1 wherein the isostatic pressing is effected at a pressure in the range of 5,000 to 60,000 p.s.i.

13. In a method of making a cathode current collector for a sodium sulphur cell comprising forming a collector of a conductive metal and coating the metal with a corrosion resistant material, wherein the improvement consists of covering at least that part of the surface of the collector exposed to a corrosive material, with a material consisting of graphite flakes and subjecting the assembly to isostatic pressing to force the graphite flakes to adhere to said surface.

14. A method as claimed in claim 13 wherein the conductive metal is aluminium or an aluminium alloy.

15. A method as claimed in claim 13 wherein the conductive metal is a nickel-based alloy containing chromium and iron.

16. A method as claimed in claim 13 wherein the conductive metal is mild steel with a protective coating of an electrically conductive material chemically inert to the cathodic reactant of the sodium sulphur cell on which coating are applied the graphite flakes.

17. A method as claimed in claim 14 wherein a surface coating of a conductive material is applied to the aluminum or aluminum alloy to form a rough surface on the aluminum or aluminum alloy, the graphite flakes being applied over said coating.

18. A method as claimed in claim 17 wherein the surface coating is of a nickel-chromium alloy.

19. A method as claimed in claim 13 wherein said conductive metal has a rough surface onto which the graphite flakes are applied.

20. A method as claimed in claim 10 wherein the rough surface is constituted by an intermediate layer of conductive material onto which the graphite flakes are applied.

21. A method as claimed in claim 20 wherein said intermediate layer is a layer of material resistant to corrosion in the cell environment.

22. A method as claimed in claim 20 wherein the intermediate layer is a nickel-chromium alloy.

23. A method as claimed in claim 20 wherein said intermediate material is a conductive carbide.

24. A method as claimed in claim 13 wherein the isostatic pressing is effected at a pressure in the range of 5,000 to 60,000 psi.

* * * * *